United States Patent
Ren et al.

(10) Patent No.: US 11,312,048 B2
(45) Date of Patent: Apr. 26, 2022

(54) SURFACE TREATMENT METHOD OF MATERIAL, MATERIAL PRODUCT AND COMPOSITE MATERIAL

(71) Applicant: GUANGDONG EVERWIN PRECISION TECHNOLOGY CO., LTD., Dongguan (CN)

(72) Inventors: Xiangsheng Ren, Dongguan (CN); Tianyu Wang, Dongguan (CN)

(73) Assignee: GUANGDONG EVERWIN PRECISION TECHNOLOGY CO., LTD., Dongguan (CN)

( * ) Notice: Subject to any disclaimer, the term of this patent is extended or adjusted under 35 U.S.C. 154(b) by 13 days.

(21) Appl. No.: 16/476,857

(22) PCT Filed: Nov. 7, 2017

(86) PCT No.: PCT/CN2017/109778
§ 371 (c)(1),
(2) Date: Jul. 9, 2019

(87) PCT Pub. No.: WO2018/129996
PCT Pub. Date: Jul. 19, 2018

(65) Prior Publication Data
US 2019/0351594 A1    Nov. 21, 2019

(30) Foreign Application Priority Data

Jan. 10, 2017 (CN) .......................... 201710016293.6
Feb. 27, 2017 (CN) .......................... 201710109397.1

(51) Int. Cl.
*C23F 1/28* (2006.01)
*C09K 13/08* (2006.01)
(Continued)

(52) U.S. Cl.
CPC .......... *B29C 45/14311* (2013.01); *B32B 3/30* (2013.01); *B32B 15/08* (2013.01);
(Continued)

(58) Field of Classification Search
None
See application file for complete search history.

(56) References Cited

U.S. PATENT DOCUMENTS 6,398,876 B1 * 6/2002 Starcevic ............... C23G 1/086
134/3
6,861,122 B2 * 3/2005 Kawai .................... C04B 35/111
216/103
(Continued)

FOREIGN PATENT DOCUMENTS

CN      102403413 A      4/2012
CN      103895156 A      7/2014
(Continued)

OTHER PUBLICATIONS

Machine English translation of JP 06010172 ; (Year: 1994).*
(Continued)

*Primary Examiner* — Shamim Ahmed
(74) *Attorney, Agent, or Firm* — W&G Law Group

(57) ABSTRACT

A surface treatment method of a material, comprising: respectively immersing a material to be treated into a first inorganic acid solution and a fluoride acidic solution to perform surface etching, so that nano-sized holes are formed in the surface of the material to be treated. Further disclosed are a material product and a composite material.

17 Claims, 4 Drawing Sheets

---

Immerse a ceramic to be treated into a fluoride acidic solution to perform a first surface etching — S101

Immerse the ceramic subjected to the first surface etching into a first inorganic acid solution to perform a second surface etching to further obtain a ceramic having nanopores formed on surface — S102

(51) Int. Cl.
| | |
|---|---|
| *B29C 45/14* | (2006.01) |
| *B32B 3/30* | (2006.01) |
| *B32B 15/08* | (2006.01) |
| *B32B 15/18* | (2006.01) |
| *C04B 41/53* | (2006.01) |
| *C04B 41/91* | (2006.01) |
| *B29K 705/12* | (2006.01) |

(52) U.S. Cl.
CPC .......... *B32B 15/18* (2013.01); *C04B 41/5353* (2013.01); *C04B 41/91* (2013.01); *C09K 13/08* (2013.01); *C23F 1/28* (2013.01); *B29C 2045/14868* (2013.01); *B29K 2705/12* (2013.01)

(56) References Cited

U.S. PATENT DOCUMENTS

| | | | | |
|---|---|---|---|---|
| 9,862,131 | B2* | 1/2018 | Gong | B29C 45/14778 |
| 2003/0228513 | A1 | 12/2003 | Wei et al. | |
| 2004/0087176 | A1 | 5/2004 | Colburn et al. | |
| 2007/0161529 | A1* | 7/2007 | Takahashi | C23F 1/18 |
| | | | | 510/175 |
| 2011/0233169 | A1* | 9/2011 | Mayfield | C23G 1/106 |
| | | | | 216/37 |
| 2013/0224590 | A1* | 8/2013 | Divigalpitiya | H01G 11/70 |
| | | | | 429/211 |
| 2014/0363658 | A1* | 12/2014 | Sun | B29C 45/14311 |
| | | | | 428/307.3 |
| 2016/0318283 | A1* | 11/2016 | Liu | B32B 15/08 |
| 2017/0327953 | A1* | 11/2017 | Yoshida | C23C 22/50 |
| 2019/0256982 | A1* | 8/2019 | Chen | C25D 3/08 |

FOREIGN PATENT DOCUMENTS

| | | | | | |
|---|---|---|---|---|---|
| CN | 104149261 | A | | 11/2014 | |
| CN | 104231629 | A | | 12/2014 | |
| CN | 104313556 | A | | 1/2015 | |
| CN | 104846389 | A | | 8/2015 | |
| CN | 104962972 | A | | 10/2015 | |
| CN | 105039987 | A | * | 11/2015 | |
| CN | 105500601 | A | | 4/2016 | |
| CN | 105522682 | A | | 4/2016 | |
| CN | 105522781 | A | | 4/2016 | |
| CN | 105522782 | A | | 4/2016 | |
| CN | 105522783 | A | | 4/2016 | |
| CN | 105908185 | A | | 8/2016 | |
| CN | 106064446 | A | * | 11/2016 | |
| CN | 106835139 | A | | 6/2017 | |
| CN | 107010998 | A | | 8/2017 | |
| GB | 1116895 | A | * | 6/1968 | ............. C11D 7/265 |
| JP | 62260082 | A | * | 11/1987 | ............. C23G 1/088 |
| JP | 06010172 | A | * | 6/1994 | ............. C23G 1/086 |

OTHER PUBLICATIONS

International Search Report, dated Feb. 2, 2018 for corresponding International Application No. PCT/CN2017/109778 with English translation.
Written Opinion of the ISA, dated Feb. 2, 2018 for corresponding International Application No. PCT/CN2017/109778.
First Office Action for CN Application No. 201710016293.6 dated Jul. 31, 2018.
Third Office Action for CN Application No. 201710109397.1 dated Nov. 26, 2019.

* cited by examiner

SURFACE TREATMENT METHOD OF MATERIAL, MATERIAL PRODUCT AND COMPOSITE MATERIAL

CROSS-REFERENCE TO RELATED APPLICATIONS

This application is a U.S. National Phase application, under 35 U.S.C. § 371, of International Application no. PCT/CN2017/109778, with an international filing date of Nov. 7, 2017, and claims benefit of China Application no. CN 201710016293.6 filed on Jan. 10, 2017 and China Application no. CN 201710109397.1 filed on Feb. 27, 2017; each of which is hereby incorporated by reference for all purposes.

TECHNICAL FIELD

The disclosure relates to a method of surface treatment of a material, a material article, and a composite material.

BACKGROUND

An integrated composite molding technology of plastics and materials refers to a technology that after a formation of nanopores on a surface of the material, a certain pressure is applied to make the plastic melt enter the nanoporous structures on the surface of the material, thereby forming a microscopic mechanical interlocking. A preparation of the nanoporous structures on the surface of the material has certain difficulties, and the commonly used heterogeneous material gluing technology at present has some disadvantages such as glue overflowing and poor bonding, and related problems such as the products formed by gluing have less autonomy in structure.

SUMMARY

The technical problem mainly to be solved by the present disclosure is to provide a method of surface treatment of a material, a material article, and a composite material, which can prepare a material having a nanoporous structure, and the product obtained by plastic injection molding has strong bonding force and is quite tightly bonded.

In order to solve the above technical problems, a technical solution adopted in the present disclosure is to provide a method of surface treatment of a material, which includes: immersing a material to be treated into a first inorganic acid solution and a fluoride acidic solution, respectively, to perform surface etching, so that nanopores are formed on a surface of the material to be treated.

In order to solve the above technical problems, another technical solution adopted in the present disclosure is to provide a material article, which is obtained by treatment with the method as described above.

In order to solve the above technical problems, yet another technical solution adopted in the present disclosure is to provide a composite material, which includes the material article as described above and a plastic injection molded onto a surface of the material article.

The present disclosure has advantageous effects that: different from the prior art, in the present disclosure, the material to be treated is immersed into the first inorganic acid solution and the fluoride acidic solution, respectively, to perform surface etching, so that nanopores are formed on the surface of the material to be treated. Since fluoride ions have strong permeability and are easy to penetrate from the loose pores formed by etching, the pitting corrosion is accelerated. In this way, the material having nanopores generated on the surface can be formed, and the product obtained by plastic injection molding using such material has strong bonding force and is quite tightly bonded.

DETAILED DESCRIPTION OF THE EMBODIMENTS

The present disclosure will be described in detail hereinafter in combination with the accompanying drawings and embodiments.

A method of surface treatment of a material according to an embodiment of the present disclosure includes: immersing a material to be treated into a first inorganic acid solution and a fluoride acidic solution, respectively, to perform surface etching, so that nanopores are formed on a surface of the material to be treated.

The material to be treated may be ceramic, stainless steel, etc., and is not limited herein.

According to the present embodiment, the material to be treated is immersed into the first inorganic acid solution and the fluoride acidic solution, respectively, to perform the surface etching, so that nanopores are formed on the surface of the material to be treated. Since fluoride ions have strong permeability and are easy to penetrate from the loose pores formed by etching, the pitting corrosion is accelerated. In this way, a ceramic having nanopores generated on the surface can be formed, and the product obtained by plastic injection molding using such material has strong bonding force and is quite tightly bonded.

Figure 1:
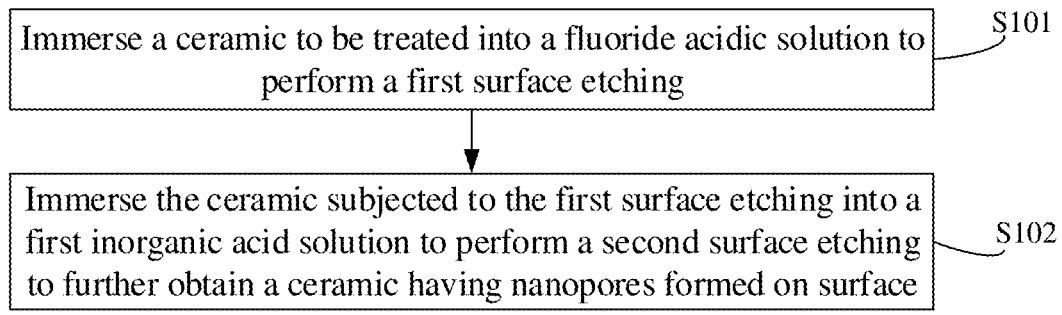
FIG. 1 is a flow chart of a method of surface treatment of a ceramic according to an embodiment of the present disclosure.

Referring to FIG. 1, FIG. 1 is a flow chart of a method of surface treatment of a ceramic according to an embodiment of the present disclosure, and the method includes:

At step S101, a ceramic to be treated is immersed into the fluoride acidic solution to perform a first surface etching.

The fluoride acidic solution includes, but is not limited to, hydrofluoric acid solution, acidic solution of ammonium hydrogen fluoride, acidic solution of ammonium fluoride, and the like. The fluoride ions have strong permeability and are easy to penetrate from the loose pores of the ceramic, thereby accelerating the pitting corrosion.

At step S102, the ceramic subjected to the first surface etching is immersed into the first inorganic acid solution to perform a second surface etching, so that a ceramic having nanopores on surface is obtained.

The first inorganic acid includes, but is not limited to, hydrochloric acid, sulfuric acid, phosphoric acid, nitric acid, and the like.

In the present embodiment, the surface etching of the ceramic can be performed more deeply by using the first inorganic acid solution for the second surface etching, and deep and uniform nanopores can be formed on the surface of the ceramic as much as possible.

According to the embodiments of the present disclosure, the ceramic to be treated is immersed into the fluoride acidic solution to perform the first surface etching, and the ceramic subjected to the first surface etching is immersed into the first inorganic acid solution to perform the second surface etching, so that the ceramic having nanopores generated on surface is obtained. Since the ceramic to be treated is first immersed into the fluoride acidic solution for the first surface etching, and the fluoride ions have strong permeability and are easy to penetrate from the loose pores of the ceramic, the pitting corrosion is accelerated. In this way, the ceramic having nanopores generated on the surface can be formed, and the product obtained by plastic injection molding using such ceramic has strong bonding force and is quite tightly bonded.

The fluoride acidic solution is a mixed solution of sodium fluoride and oxalic acid.

The sodium fluoride solution has a concentration of 50 grams per liter to 200 grams per liter (g/L), for example, 50 g/L, 100 g/L, 130 g/L, 160 g/L, 200 g/L, etc., and the oxalic acid solution has a concentration of 20 grams per liter to 60 grams per liter, for example, 20 g/L, 30 g/L, 40 g/L, 50 g/L, 60 g/L, etc. An immersion time in this fluoride acidic solution ranges from 240 seconds to 720 seconds (s), for example, 240 s, 360 s, 480 s, 600 s, 720 s, etc. In general, when the concentration is high, the immersion time may be shorter. When the concentration is low, the immersion time may be longer.

The fluoride acidic solution may also be an acidic solution of sodium hydrogen fluoride.

The first inorganic acid solution is a mixed solution of phosphoric acid and a corrosion inhibitor. The corrosion inhibitor includes, but is not limited to, copper sulfate, chromate, nitrite, silicate, and the like.

In the first inorganic acid solution, the phosphoric acid has a concentration of 100 g/L to 400 g/L, for example: 100 g/L, 200 g/L, 300 g/L, 400 g/L, etc., and the corrosion inhibitor has a concentration of 2 g/L to 5 g/L, for example, 2 g/L, 3 g/L, 4 g/L, 5 g/L, etc. An immersion time in this first inorganic acid solution ranges from 180 s to 540 s, for example, 180 s, 240 s, 300 s, 420 s, 540 s, etc. In general, when the concentration is high, the immersion time may be shorter. When the concentration is low, the immersion time may be longer.

In order to obtain more uniform nanopores, pretreatment may be carried out to remove oil stains on the surface of the ceramic before etching. Specifically, before the step S101, a step of pretreating the ceramic to be treated to remove the oil stains on the surface of the ceramic is further included.

The pretreatment may be a treatment that performing surface treatment with ethanol and then cleaning with deionized water and drying.

Figure 2:
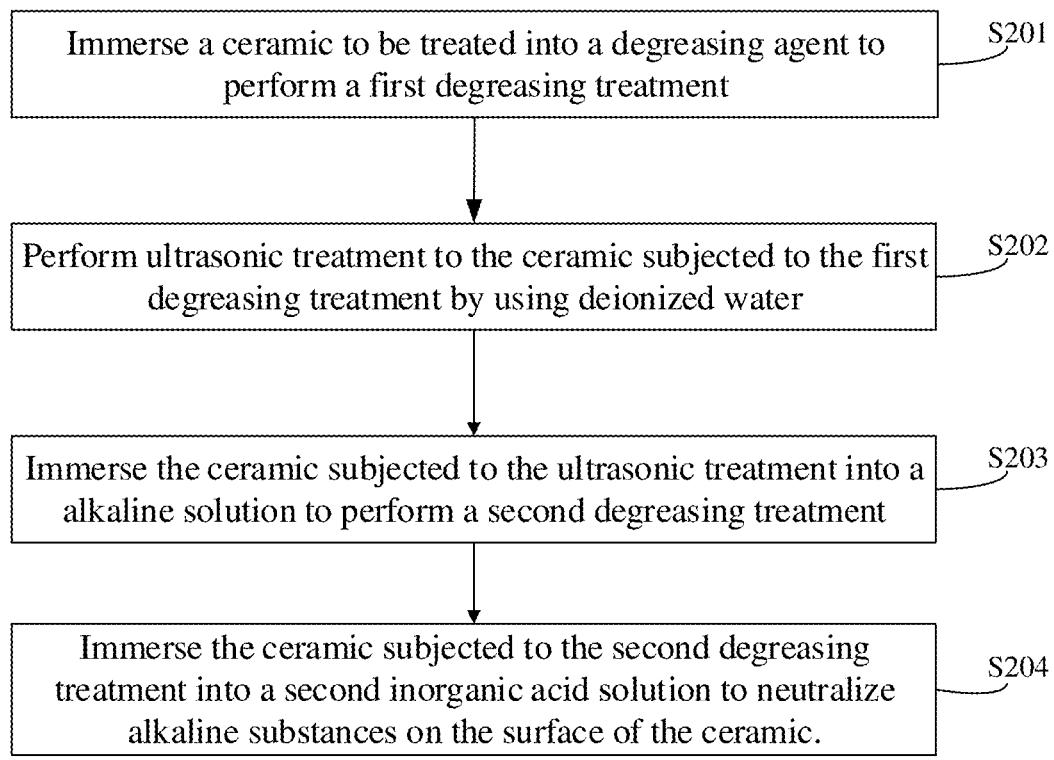
FIG. 2 is a flow chart of a method of surface treatment of a ceramic according to another embodiment of the present disclosure.

Referring to FIG. 2, in the present embodiment, the step of pretreating the ceramic to be treated to remove the oil stains from the surface of the ceramic includes step S201, step S202, step S203, and step S204.

At step S201, the ceramic to be treated is immersed into a degreasing agent to perform a first degreasing treatment.

The degreasing agent is mainly formulated from a variety of surfactants and detergent builders, which is easy to use and can easily remove lubricating greases, carbon agents, and mildew spots from the surfaces of various materials. The degreasing agent is safe, simple, economical and effective, and has the following characteristics: strong permeable emulsification and fast degreasing speed; containing a unique rust inhibitor and having short-term rust prevention ability; non-combustible and non-explosive; and weakly alkaline, and does not corrode machines and equipment, for example, Huiling 6007.

At step S202, ultrasonic treatment is performed to the ceramic subjected to the first degreasing treatment by using deionized water.

Since there are some irregular small pores invisible to the naked eye on the surface of the ceramic itself, during the removal of the oil stains from the surface of the ceramic, the small pores on the surface of the ceramic may also adsorb some degreasing agent, which is not conducive to subsequent further degreasing treatment. Therefore, ultrasonic treatment is performed to the ceramic subjected to the first degreasing treatment using deionized water to remove the degreasing agent adsorbed on the surface of the ceramic.

At step S203, the ceramic subjected to the ultrasonic treatment is immersed into a first alkaline solution to perform a second degreasing treatment.

The first alkaline solution includes, but is not limited to, sodium hydroxide solution, potassium hydroxide solution, sodium carbonate solution, and the like. The oil stains on the surface of the ceramic may be determined again and further removed by re-treatment with the first alkaline solution.

At step S204, the ceramic subjected to the second degreasing treatment is immersed into a second inorganic acid solution to neutralize alkaline substances on the surface of the ceramic.

The second inorganic acid includes, but is not limited to, hydrochloric acid, sulfuric acid, and the like. The ceramic subjected to the second degreasing treatment is immersed into the second inorganic acid solution to neutralize the alkaline substances on the surface of the ceramic, so that the residual alkaline substances on the surface of the ceramic can be prevented from affecting the subsequent surface etching treatment.

The degreasing agent has a concentration of 30 g/L to 100 g/L, for example, 30 g/L, 50 g/L, 70 g/L, 90 g/L, 100 g/L, etc. An immersion time of the ceramic in the degreasing agent ranges from 180 s to 600 s, for example, 180 s, 250 s, 350 s, 450 s, 600 s, etc. The first alkaline solution is a sodium hydroxide solution which has a concentration of 100 g/L to 200 g/L, for example, 100 g/L, 140 g/L, 180 g/L, 200 g/L, etc. An immersion time of the ceramic in the sodium hydroxide solution ranges from 60 s to 360 s, for example, 60 s, 180 s, 240 s, 300 s, 360 s, etc. The second inorganic acid solution is a hydrochloric acid solution which has a concentration of 40 g/L to 150 g/L, for example, 40 g/L, 80 g/L, 120 g/L, 150 g/L, etc. An immersion time of the ceramic in the hydrochloric acid solution ranges from 30 s to 210 s, for example, 30 s, 60 s, 120 s, 180 s, 210 s, etc.

Figure 3:
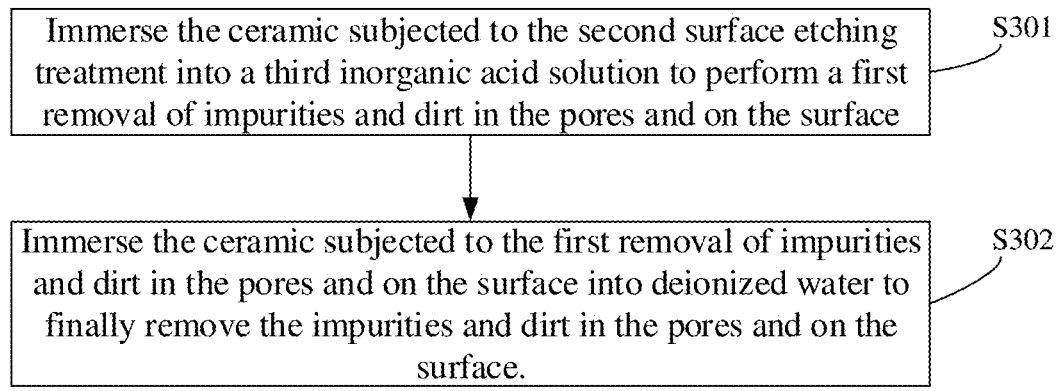
FIG. 3 is a flow chart of a method of surface treatment of a ceramic according to a further embodiment of the present disclosure.

Further, as shown in FIG. 3, after the step S102, step S301 and step S302 may further be included.

At step S301, the ceramic subjected to the second surface etching treatment is immersed into a third inorganic acid solution to perform a first removal of impurities and dirt in the pores and on the surface.

The third inorganic acid includes, but is not limited to, hydrochloric acid, nitric acid, sulfuric acid, and the like. This step is to remove the impurities and dirt in the nanopores and on the surface of the ceramic.

At step S302, the ceramic subjected to the first removal of impurities and dirt in the pores and on the surface is immersed into deionized water to finally remove the impurities and dirt in the pores and on the surface.

This step is to reconfirm and finally remove the impurities and dirt in the pores and on the surface.

The third inorganic acid solution is a nitric acid solution which has a concentration of 50 g/L to 300 g/L, for example, 50 g/L, 100 g/L, 150 g/L, 200 g/L, 250 g/L, 300 g/L, etc. An immersion time in the nitric acid solution ranges from 30 s to 180 s, for example, 30 s, 60 s, 100 s, 150 s, 180 s, etc.

The present disclosure also provides a ceramic article obtained by the treatment with any one of the above methods. The ceramic obtained by the above method may be naturally cooled and bagged for antifouling after further being baked at a high temperature of 50° C. to 90° C.

The present disclosure further provides a ceramic plastic composite, which includes the ceramic article as described above and a plastic injection molded onto a surface of the ceramic article.

After the surface treatment of the above etching process and plastic injection molding, the product has strong bonding force and is quite tightly bonded, therefore, the problems such as insufficient bonding force, glue overflowing or inaccurate precision for adhesive types are solved, the structure derived from the surface of the ceramic can be freely designed, and the workpiece processing time and the cost of manpower and equipment can be saved. By the injection molding of the mold, the product has a more diversified design space.

Hereinafter, the ceramics and the ceramic plastic composites having nanopores on the surface obtained by the above method according to the present disclosure will be described in the specific embodiments.

Example 1

Pretreatment: a ceramic was immersed into 30 g/L of Huiling 6007 for 600 s and taken out, then subjected to ultrasonic treatment with deionized water to remove a degreasing agent on a surface of the ceramic, and then immersed into 140 g/L of sodium hydroxide solution to perform a second degreasing treatment for 300 s and taken out, and then immersed into 120 g/L of hydrochloric acid solution for neutralization for 60 s, to complete the pretreatment.

The first surface etching: the ceramic subjected to the aforementioned pretreatment was immersed into a mixed solution of sodium fluoride and oxalic acid for 720 s, in which a concentration of the sodium fluoride solution was 50 g/L, and a concentration of the oxalic acid solution was 20 g/L.

The second surface etching: the ceramic subjected to the first surface etching was immersed into a mixed solution of nitric acid and copper sulfate for 420 s, in which a concentration of nitric acid was 200 g/L, and a concentration of copper sulfate was 3 g/L.

The first removal of the impurities and dirt in the pores and on the surface: the ceramic subjected to the second surface etching was immersed into 200 g/L of nitric acid solution for 100 s.

The final removal of the impurities and dirt in the pores and on the surface: the ceramic subjected to the first removal of the impurities and dirt in the pores and on the surface was immersed into deionized water.

Figure 4:
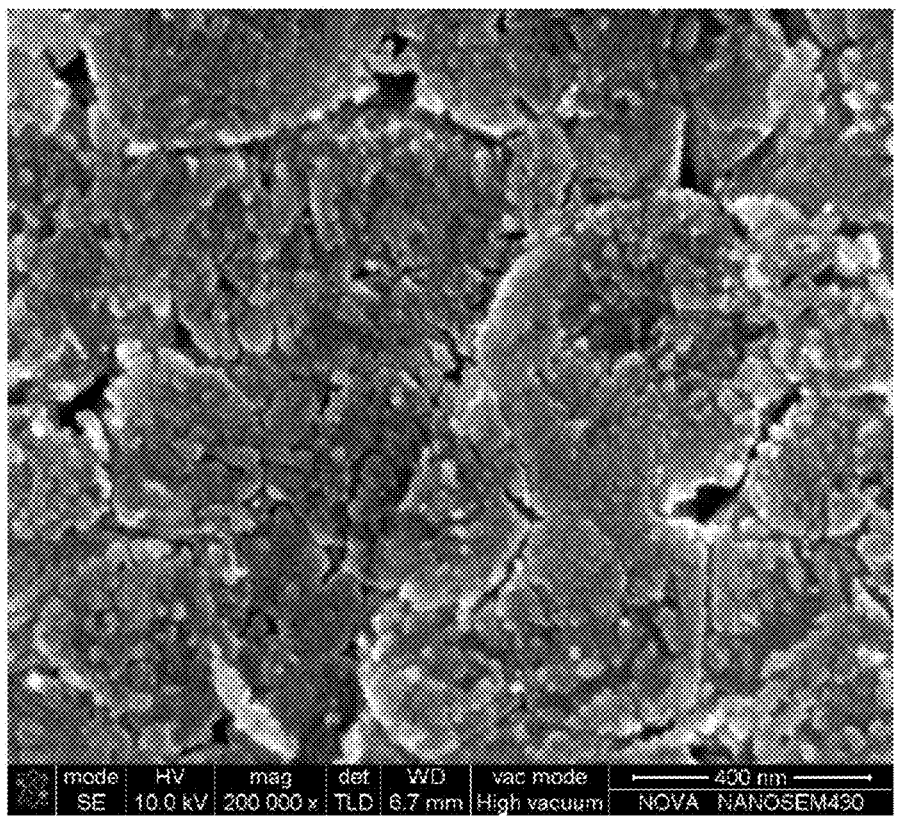
FIG. 4 is a schematic scanning electron micrograph of a ceramic finally obtained by a method of surface treatment of a ceramic according to the present disclosure.

After the final removal of the impurities and dirt in the pores and on the surface, the ceramic was baked at a baking temperature of 50° C. to 90° C., cooled, and then observed by scanning electron microscope (SEM). The results are shown in FIG. 4, in which nanoporous structure formed on the surface of the ceramic can be observed.

Injection molding: the ceramic subjected to the final removal of the impurities and dirt in the pores and on the surface was baked at a temperature of 50° C. to 90° C., cooled, and then bonded with a plastic by injection molding to form a ceramic plastic composite.

Tensile test: the tensile test was carried out on the injection molded ceramic plastic composite using a push-pull machine HM-6650C. The results are shown in Table 1.

Example 2

Pretreatment: a ceramic was immersed into 50 g/L of Huiling 6007 for 450 s and taken out, then subjected to ultrasonic treatment with deionized water to remove a degreasing agent on a surface of the ceramic, and then immersed into 180 g/L of sodium hydroxide solution to perform a second degreasing treatment for 180 s and taken out, and then immersed into 40 g/L of hydrochloric acid solution for neutralization for 210 s, to complete the pretreatment.

The first surface etching: the ceramic subjected to the aforementioned pretreatment was immersed into a mixed solution of sodium fluoride and oxalic acid for 480 s, in which a concentration of the sodium fluoride solution was 130 g/L, and a concentration of the oxalic acid solution was 40 g/L.

The second surface etching: the ceramic subjected to the first surface etching was immersed into a mixed solution of nitric acid and copper sulfate for 540 s, in which a concentration of nitric acid was 100 g/L, and a concentration of copper sulfate was 2 g/L.

The first removal of the impurities and dirt in the pores and on the surface: the ceramic subjected to the second surface etching was immersed into 300 g/L of nitric acid solution for 30 s.

The final removal of the impurities and dirt in the pores and on the surface: the ceramic subjected to the first removal of the impurities and dirt in the pores and on the surface was immersed into deionized water.

Injection molding: the ceramic subjected to the final removal of the impurities and dirt in the pores and on the surface was baked at a temperature of 50° C. to 90° C., cooled, and then bonded with a plastic by injection molding.

Tensile test: the tensile test was carried out on the injection molded ceramic plastic composite using a push-pull machine HM-6650C. The results are shown in Table 1.

Example 3

Pretreatment: a ceramic was immersed into 70 g/L of Huiling 6007 for 350 s and taken out, subjected to ultrasonic treatment with deionized water to remove a degreasing agent on a surface of the ceramic, and then immersed into 100 g/L of sodium hydroxide solution to perform a second degreasing treatment for 360 s, then taken out, and then immersed into 150 g/L of hydrochloric acid solution for neutralization for 30 s to complete the pretreatment.

The first surface etching: the ceramic subjected to the aforementioned pretreatment was immersed into a mixed solution of sodium fluoride and oxalic acid for 360 s, in which a concentration of the sodium fluoride solution was 160 g/L, and a concentration of the oxalic acid solution was 50 g/L.

The second surface etching: the ceramic subjected to the first surface etching was immersed into a mixed solution of nitric acid and copper sulfate for 240 s, in which a concentration of nitric acid was 300 g/L, and a concentration of copper sulfate was 4 g/L.

The first removal of the impurities and dirt in the pores and on the surface: the ceramic subjected to the second surface etching was immersed into 100 g/L of nitric acid solution for 150 s.

The final removal of the impurities and dirt in the pores and on the surface: the ceramic subjected to the first removal of the impurities and dirt in the pores and on the surface was immersed into deionized water.

Injection molding: the ceramic subjected to the final removal of the impurities and dirt in the pores and on the surface was baked a temperature of 50° C. to 90° C., cooled, and then bonded with a plastic by injection molding.

Tensile test: the tensile test was carried out on the injection molded ceramic plastic composite using a push-pull machine HM-6650C. The results are shown in Table 1.

Example 4

Pretreatment: a ceramic was immersed into 90 g/L of Huiling 6007 for 250 s and taken out, then subjected to ultrasonic treatment with deionized water to remove a degreasing agent on a surface of the ceramic, and then immersed into 140 g/L of sodium hydroxide solution to perform a second degreasing treatment for 240 s and taken out, and then immersed into 80 g/L of hydrochloric acid solution for neutralization for 180 s, to complete the pretreatment.

The first surface etching: the ceramic subjected to the aforementioned pretreatment was immersed into a mixed solution of sodium fluoride and oxalic acid for 600 s, in which a concentration of the sodium fluoride solution was 100 g/L, and a concentration of the oxalic acid solution was 30 g/L.

The second surface etching: the ceramic subjected to the first surface etching was immersed into a mixed solution of nitric acid and copper sulfate for 180 s, in which a the concentration of nitric acid was 400 g/L, and a concentration of copper sulfate was 5 g/L.

The first removal of the impurities and dirt in the pores and on the surface: the ceramic subjected to the second surface etching was immersed into 250 g/L of nitric acid solution for 60 s.

The final removal of the impurities and dirt in the pores and on the surface: the ceramic subjected to the first removal of the impurities and dirt in the pores and on the surface was immersed into deionized water.

Injection molding: the ceramic subjected to the final removal of the impurities and dirt in the pores and on the surface was baked at a temperature of 50° C. to 90° C., cooled, and then bonded with a plastic by injection molding.

Tensile test: the tensile test was carried out on the injection molded ceramic plastic composite using a push-pull machine HM-6650C. The results are shown in Table 1.

Example 5

Pretreatment: a ceramic was immersed into 100 g/L of Huiling 6007 for 180 s and taken out, then subjected to ultrasonic treatment with deionized water to remove a degreasing agent on a surface of the ceramic, and then immersed into 200 g/L of sodium hydroxide solution to perform a second degreasing treatment for 60 s and taken out, and then immersed into 120 g/L of hydrochloric acid solution for neutralization for 120 s, to complete the pretreatment.

The first surface etching: the ceramic subjected to the aforementioned pretreatment was immersed into a mixed solution of sodium fluoride and oxalic acid for 240 s, in which a concentration of the sodium fluoride solution was 200 g/L, and a concentration of the oxalic acid solution was 60 g/L.

The second surface etching: the ceramic subjected to the first surface etching was immersed into a mixed solution of nitric acid and copper sulfate for 300 s, in which a concentration of nitric acid was 200 g/L, and a concentration of copper sulfate was 3 g/L.

The first removal of the impurities and dirt in the pores and on the surface: the ceramic subjected to the second surface etching was immersed into 50 g/L of nitric acid solution for 180 s.

The final removal of the impurities and dirt in the pores and on the surface: the ceramic subjected to the first removal of the impurities and dirt in the pores and on the surface was immersed into deionized water.

Injection molding: the ceramic subjected to the final removal of the impurities and dirt in the pores and on the surface was baked at a temperature of 50° C. to 90° C., cooled, and then bonded with a plastic by injection molding.

Tensile test: the tensile test was carried out on the injection molded ceramic plastic composite using a push-pull machine HM-6650C. The results are shown in Table 1.

Comparative Example 1

Ceramic plastic composite: a plastic was glued together with a ceramic that have not been treated by the present method via gluing technology.

Tensile test: the tensile test was carried out on the injection molded ceramic plastic composite using a push-pull machine HM-6650C. The results are shown in Table 1.

TABLE 1

| Items | Tensile test results/KGF |
|---|---|
| Example 1 | 105.20 |
| Example 2 | 109.90 |
| Example 3 | 108.00 |
| Example 4 | 106.35 |
| Example 5 | 110.35 |
| Comparative Example 1 | 26.19 |

It can be seen from the above test results that the tensile forces of Examples 1 to 5 using the method of the present disclosure are much greater than that of the Comparative example. Therefore, the product obtained by the injection molding using the ceramic treated by the present method and the plastic has strong bonding force and is quite tightly bonded.

Figure 5:
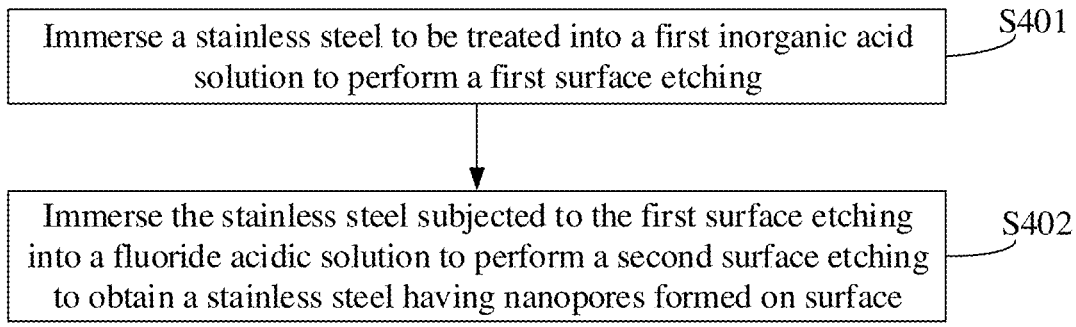
FIG. 5 is a flow chart of a method of surface treatment of a stainless steel according to an embodiment of the present disclosure.

Referring to FIG. 5, FIG. 5 is a flow chart of a method of surface treatment of a stainless steel according to an embodiment of the present disclosure, and the method includes:

At step S401, a stainless steel to be treated is immersed into the first inorganic acid solution to perform a first surface etching.

The first inorganic acid includes, but is not limited to, hydrochloric acid, sulfuric acid, phosphoric acid, nitric acid, and the like.

In the present embodiment, the surface etching is performed by using the first inorganic acid solution, such that the surface of the stainless steel to be treated can be etched uniformly and conformably, and nanopores having a relatively uniform size can be formed on the surface of the stainless steel as much as possible.

At step S402, the stainless steel subjected to the first surface etching is immersed into the fluoride acidic solution to perform a second surface etching, so that a stainless steel having nanopores on surface is obtained.

The fluoride acidic solution includes, but is not limited to, hydrofluoric acid solution, acidic solution of ammonium hydrogen fluoride, acidic solution of ammonium fluoride, and the like. Since fluoride ions have strong permeability and are easy to penetrate from loose pores formed by the first etching, the pitting corrosion is accelerated. In this way, the stainless steel having uniform nanopores generated on surface can be formed.

According to the embodiments of the present disclosure, the stainless steel to be treated is immersed into the first inorganic acid solution to perform the first surface etching, and the stainless steel subjected to the first surface etching is immersed into the fluoride acidic solution to perform the second surface etching, so that the stainless steel having nanopores generated on surface is obtained. Since the stainless steel to be treated is first immersed into the first inorganic acid solution for the first surface etching, and the fluoride ions have strong permeability and are easy to penetrate from the loose pores formed by the first etching, the pitting corrosion is accelerated. In this way, the stainless steel having nanopores generated on the surface can be formed, and the product obtained by plastic injection molding using such stainless steel has strong bonding force and is quite tightly bonded.

The first inorganic acid solution is a mixed solution of hydrochloric acid, sulfuric acid, and a corrosion inhibitor. The corrosion inhibitor includes, but is not limited to, copper sulfate, chromate, nitrite, silicate, and the like.

In the first inorganic acid solution, the hydrochloric acid has a concentration of 60 grams per liter to 300 grams per liter (g/L), for example, 60 g/L, 100 g/L, 200 g/L, 300 g/L, etc., the sulfuric acid has a concentration of 40 grams per liter to 200 grams per liter, for example, 40 g/L, 100 g/L, 150 g/L, 200 g/L, etc., and the corrosion inhibitor has a concentration of 2 grams per liter to 5 grams per liter, for example, 2 g/L, 3 g/L, 4 g/L, 5 g/L, etc. An immersion time in this first inorganic acid solution ranges from 60 seconds to 600 seconds (s), for example, 60 s, 150 s, 300 s, 420 s, 600 s, etc. In general, when the concentration is high, the immersion time may be shorter. When the concentration is low, the immersion time may be longer.

The first inorganic acid solution is a mixed solution of sulfuric acid and corrosion inhibitor.

The fluoride acidic solution is a mixed solution of sodium fluoride and oxalic acid.

The sodium fluoride solution has a concentration of 10 grams per liter to 50 grams per liter, for example, 10 g/L, 20 g/L, 30 g/L, 40 g/L, 50 g/L, etc., and the oxalic acid solution has a concentration of 20 grams per liter to 60 grams per liter, for example, 20 g/L, 30 g/L, 40 g/L, 50 g/L, 60 g/L, etc. An immersion time in this fluoride acidic solution ranges from 60 s to 600 s, for example, 60 s, 150 s, 300 s, 450 s, 600 s, etc. In general, when the concentration is high, the immersion time may be shorter. When the concentration is low, the immersion time may be longer.

The fluoride acidic solution may also be an acidic solution of sodium hydrogen fluoride.

In order to obtain more uniform nanopores, pretreatment may be performed to remove oil stains on the surface of the stainless steel before etching. Specifically, before the step S401, a step of pretreating the stainless steel to be treated to remove the oil stains on the surface of the stainless steel is further included.

Figure 6:
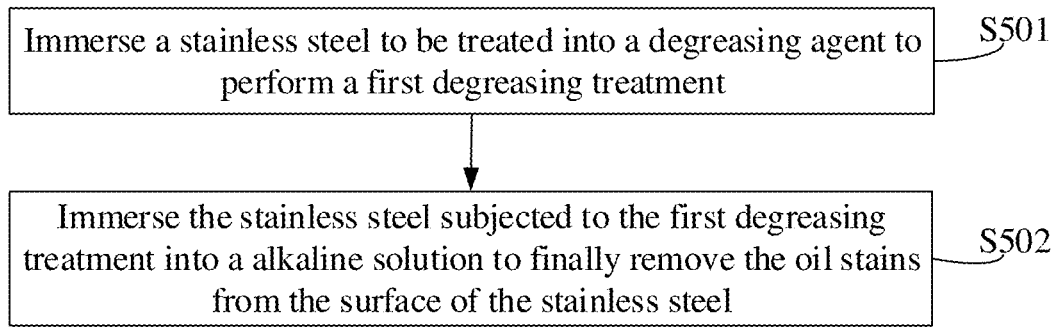
FIG. 6 is a flow chart of a method of surface treatment of a stainless steel according to another embodiment of the present disclosure.

The pretreatment may be a treatment that performing surface treatment with ethanol and then cleaning with deionized water and drying. Referring to FIG. 6, in the present embodiment, the step of pretreating the stainless steel to be treated to remove the oil stains from the surface of the stainless steel includes step S501 and step S502.

At step S501, the stainless steel to be treated is immersed into a degreasing agent to perform a first degreasing treatment.

The degreasing agent is mainly formulated from a variety of surfactants and detergent builders, which is easy to use and can easily remove lubricating greases, carbon agents, and mildew spots from the surfaces of various materials. The degreasing agent is safe, simple, economical and effective, and has the following characteristics: strong permeable emulsification and fast degreasing speed; containing a unique rust inhibitor and having short-term rust prevention ability; non-combustible and non-explosive; and weakly alkaline, and does not corrode machines and equipment, for example, Huiling 6007.

At step S502, the stainless steel subjected to the first degreasing treatment is immersed into a second alkaline solution to finally remove the oil stains from the surface of the stainless steel.

The second alkaline solution includes, but is not limited to, sodium hydroxide solution, potassium hydroxide solution, sodium carbonate solution, and the like. The removal of the oil stains from the surface may be determined again by re-treatment with the second alkaline solution.

The degreasing agent has a concentration of 30 grams per liter to 100 grams per liter, for example, 30 g/L, 50 g/L, 70 g/L, 90 g/L, 100 g/L, etc. An immersion time in the degreasing agent ranges from 180 s to 600 s, for example, 180 s, 250 s, 350 s, 450 s, 600 s, etc. The second alkaline solution is a sodium carbonate solution which has a concentration of 30 grams per liter to 80 grams per liter, for example, 30 g/L, 50 g/L, 70 g/L, 80 g/L, etc. An immersion time in the sodium carbonate solution ranges from 60 s to 240 s, for example, 60 s, 100 s, 150 s, 200 s, 240 s, etc.

Figure 7:
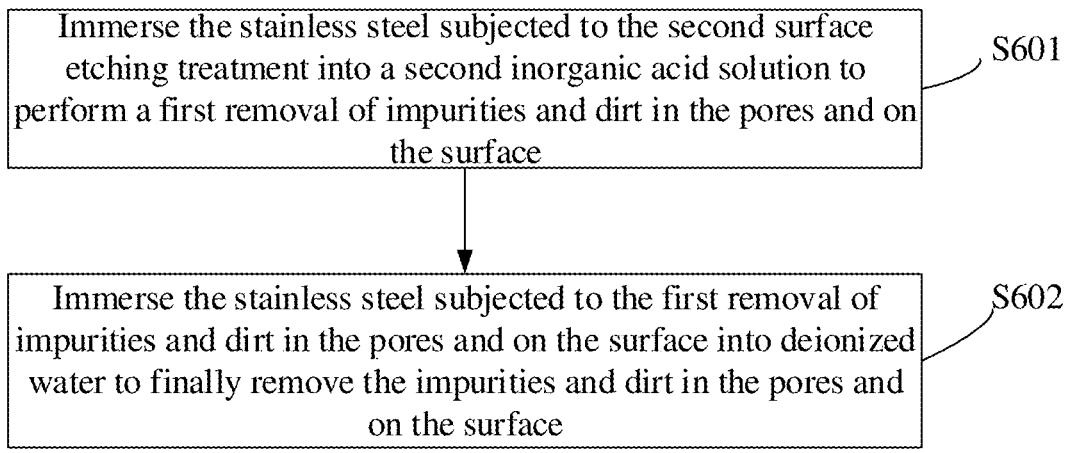
FIG. 7 is a flow chart of a method of surface treatment of a stainless steel according to a further embodiment of the present disclosure.

Further, as shown in FIG. 7, after the step S402, step S601 and step S602 may also be included.

At step S601, the stainless steel subjected to the second surface etching treatment is immersed into a second inorganic acid solution to perform a first removal of impurities and dirt in the pores and on the surface.

The second inorganic acid includes, but is not limited to, hydrochloric acid, nitric acid, sulfuric acid, and the like. This step is to remove the impurities and dirt in the nanopores and on the surface of the stainless steel.

At step S602, the stainless steel subjected to the first removal of impurities and dirt in the pores and on the surface is immersed into deionized water to finally remove the impurities and dirt in the pores and on the surface.

This step is to reconfirm and finally remove the impurities and dirt in the pores and on the surface.

The second inorganic acid solution is a nitric acid solution which has a concentration of 40 g/L to 150 g/L, for example, 40 g/L, 80 g/L, 120 g/L, 150 g/L, etc. An immersion time in the nitric acid solution ranges from 30 s to 300 s, for example, 30 s, 100 s, 200 s, 300 s, etc.

The present disclosure also provides a stainless steel article obtained by the treatment with any one of the above methods. The stainless steel obtained by the above method may be naturally cooled and bagged for antifouling after further being baked at a high temperature of 50° C. to 90° C.

The present disclosure further provides a stainless steel plastic composite, which includes the stainless steel article as described above and a plastic injection molded onto a surface of the stainless steel article.

After the surface treatment of the above etching processes and plastic injection molding, the product has strong bonding force and is quite tightly bonded, therefore, the problems such as insufficient bonding force, glue overflowing or inaccurate precision for adhesive types are solved, the structure derived from the surface of metals can be freely designed, and the workpiece processing time and the cost of manpower and equipment can be saved. By the injection molding of the mold, the product has a more diversified design space.

Hereinafter, the stainless steel and the stainless steel plastic composite having nanopores on the surface obtained by the above method according to the present disclosure will be described in the specific embodiments.

Example 6

Pretreatment: a stainless steel was immersed into 30 g/L of Huiling 6007 for 600 s and taken out, then immersed into 30 g/L of sodium carbonate solution for 240 s.

The first surface etching: the stainless steel subjected to the aforementioned pretreatment was immersed into a first inorganic acid solution composed of 60 g/L of hydrochloric acid, 40 g/L of sulfuric acid, and 2 g/L of copper sulfate for 600 s.

The second surface etching: the stainless steel subjected to the first surface etching was immersed into a sodium fluoride acidic solution composed of 10 g/L of sodium fluoride and 20 g/L of oxalic acid for 600 s.

The first removal of the impurities and dirt in the pores and on the surface: the stainless steel subjected to the second surface etching was immersed into 40 g/L of nitric acid solution for 300 s.

Figure 8:
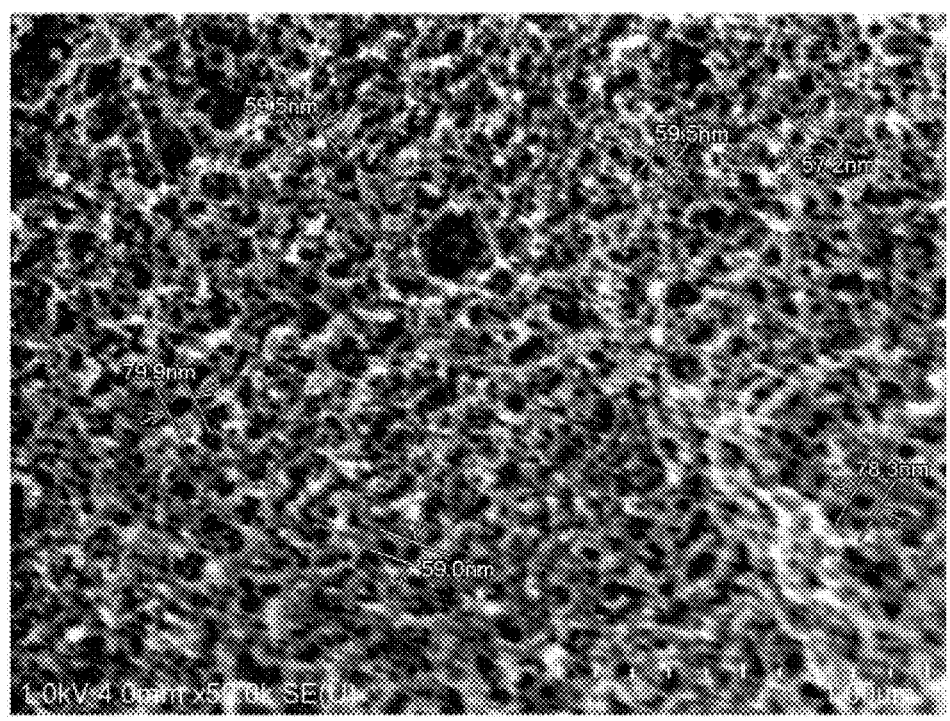
FIG. 8 is a schematic scanning electron micrograph of a stainless steel finally obtained by a method of surface treatment of a stainless steel according to the present disclosure.

The final removal of the impurities and dirt in the pores and on the surface: the stainless steel subjected to the first removal of the impurities and dirt in the pores and on the surface was immersed into deionized water. The stainless steel subjected to the final removal of the impurities and dirt in the pores and on the surface was baked at a temperature of 50° C. to 90° C., cooled, and then observed by scanning electron microscope (SEM). The results are shown in FIG. 8, in which nanoporous structure formed on the surface of the stainless steel can be observed.

Injection molding: the stainless steel subjected to the final removal of the impurities and dirt in the pores and on the surface was baked at a temperature of 50° C. to 90° C., cooled, and then injection molded with a plastic.

Thrust test: the thrust test was carried out on the injection molded stainless steel plastic composite using a push-pull machine HM-6650C. The results are shown in Table 2.

Example 7

Pretreatment: a stainless steel was immersed into 50 g/L of Huiling 6007 for 400 s and taken out, then immersed into 50 g/L of sodium carbonate solution for 150 s.

The first surface etching: the stainless steel subjected to the aforementioned pretreatment was immersed into a first inorganic acid solution composed of 100 g/L of hydrochloric acid, 100 g/L of sulfuric acid, and 3 g/L of copper sulfate for 400 s.

The second surface etching: the stainless steel subjected to the first surface etching was immersed into a sodium fluoride acidic solution composed of 25 g/L of sodium fluoride and 30 g/L of oxalic acid for 450 s.

The first removal of the impurities and dirt in the pores and on the surface: the stainless steel subjected to the second surface etching was immersed into 80 g/L of nitric acid solution for 150 s.

The final removal of the impurities and dirt in the pores and on the surface: the stainless steel subjected to the first removal of the impurities and dirt in the pores and on the surface was immersed into deionized water.

Injection molding: the stainless steel subjected to the final removal of the impurities and dirt in the pores and on the surface was baked at a temperature of 50° C. to 90° C., cooled, and then injection molded with a plastic.

Thrust test: the thrust test was carried out on the injection molded stainless steel plastic composite using a push-pull machine HM-6650C. The results are shown in Table 2.

Example 8

Pretreatment: a stainless steel was immersed into 70 g/L of Huiling 6007 for 300 s and taken out, then immersed into 70 g/L of sodium carbonate solution for 80 s.

The first surface etching: the stainless steel subjected to the aforementioned pretreatment was immersed into a first inorganic acid solution composed of 200 g/L of hydrochloric acid, 150 g/L of sulfuric acid, and 4 g/L of copper sulfate for 200 s.

The second surface etching: the stainless steel subjected to the first surface etching was immersed into a sodium fluoride acidic solution composed of 40 g/L of sodium fluoride and 45 g/L of oxalic acid for 200 s.

The first removal of the impurities and dirt in the pores and on the surface: the stainless steel subjected to the second surface etching was immersed into 120 g/L of nitric acid solution for 75 s.

The final removal of the impurities and dirt in the pores and on the surface: the stainless steel subjected to the first removal of the impurities and dirt in the pores and on the surface was immersed into deionized water.

Injection molding: the stainless steel subjected to the final removal of the impurities and dirt in the pores and on the surface was baked at a temperature of 50° C. to 90° C., cooled, and then injection molded with a plastic.

Thrust test: the thrust test was carried out on the injection molded stainless steel plastic composite using a push-pull machine HM-6650C. The results are shown in Table 2.

Example 9

Pretreatment: a stainless steel was immersed into 100 g/L of Huiling 6007 for 180 s and taken out, then immersed into 80 g/L of sodium carbonate solution for 60 s.

The first surface etching: the stainless steel subjected to the aforementioned pretreatment was immersed into a first inorganic acid solution composed of 300 g/L of hydrochloric acid, 200 g/L of sulfuric acid, and 5 g/L of copper sulfate for 60 s.

The second surface etching: the stainless steel subjected to the first surface etching was immersed into a sodium fluoride acidic solution composed of 50 g/L of sodium fluoride and 60 g/L of oxalic acid for 60 s.

The first removal of the impurities and dirt in the pores and on the surface: the stainless steel subjected to the second surface etching was immersed into 150 g/L of nitric acid solution for 30 s.

The final removal of the impurities and dirt in the pores and on the surface: the stainless steel subjected to the first removal of the impurities and dirt in the pores and on the surface was immersed into deionized water.

Injection molding: the stainless steel subjected to the final removal of the impurities and dirt in the pores and on the surface was baked at a temperature of 50° C. to 90° C., cooled, and then injection molded with a plastic.

Thrust test: the thrust test was carried out on the injection molded stainless steel plastic composite using a push-pull machine HM-6650C. The results are shown in Table 2.

Example 10

Pretreatment: a stainless steel was immersed into 100 g/L of Huiling 6007 for 180 s and taken out, then immersed into 80 g/L of sodium hydroxide solution for 60 s.

The first surface etching: the stainless steel subjected to the aforementioned pretreatment was immersed into a first inorganic acid solution composed of 200 g/L of sulfuric acid and 5 g/L of corrosion inhibitor for 120 s.

The second surface etching: the stainless steel subjected to the first surface etching was immersed into 50 g/L of an acidic solution of sodium hydrogen fluoride for 70 s.

The first removal of the impurities and dirt in the pores and on the surface: the stainless steel subjected to the second surface etching was immersed into 150 g/L of nitric acid solution for 30 s.

The final removal of the impurities and dirt in the pores and on the surface: the stainless steel subjected to the first removal of the impurities and dirt in the pores and on the surface was immersed into deionized water.

Injection molding: the stainless steel subjected to the final removal of the impurities and dirt in the pores and on the surface was baked at a temperature of 50° C. to 90° C., cooled, and then injection molded with a plastic.

Thrust test: the thrust test was carried out on the injection molded stainless steel plastic composite using a push-pull machine HM-6650C. The results are shown in Table 2.

Comparative Example 2

Stainless steel plastic composite: a plastic was glued together with a stainless steel that has not been treated by the present method via gluing technology.

Thrust test: the thrust test was carried out on the injection molded stainless steel plastic composite using a push-pull machine HM-6650C. The results are shown in Table 2.

TABLE 2

| Items | Thrust test results/KGF |
|---|---|
| Example 6 | 138.26 |
| Example 7 | 145.68 |
| Example 8 | 150.12 |
| Example 9 | 155.68 |
| Example 10 | 140.75 |
| Comparative Example 2 | 27.3 |

It can be seen from the above test results that the tensile forces of Examples 6 to 10 using the method of the present disclosure are much greater than that of the Comparative example. Therefore, the product obtained by the injection molding using the stainless steel treated by the present method and the plastic has strong bonding force and is quite tightly bonded.

The above is only the embodiments of the present disclosure, and is not intended to limit the scope of the present disclosure. The equivalent structure or equivalent process transformations made according to the contents of the description and drawings of the present disclosure which are directly or indirectly applied to other related technologies are all included in the scope of the present disclosure.

What is claimed is:

1. A method of surface treatment of a material, comprising:
   immersing a material to be treated into a first inorganic acid solution and a fluoride acidic solution, respectively, to perform surface etching, so that nanopores are formed on a surface of the material to be treated,
   wherein the fluoride acidic solution is a mixed solution of sodium fluoride and oxalic acid.

2. The method of claim 1, wherein the material is ceramic, and the step of immersing the material to be treated into the first inorganic acid solution and the fluoride acidic solution, respectively, to perform the surface etching, so that the nanopores are formed on the surface of the material to be treated comprises:
   immersing the ceramic to be treated into the fluoride acidic solution to perform a first surface etching; and
   immersing the ceramic subjected to the first surface etching into the first inorganic acid solution to perform a second surface etching, thereby obtaining a ceramic having nanopores on the surface.

3. The method of claim 2, wherein the sodium fluoride has a concentration of 50 g/L to 200 g/L, the oxalic acid has a concentration of 20 g/L to 60 g/L, and an immersion time in the fluoride acidic solution ranges from 240 seconds to 720 seconds.

4. The method of claim 2, wherein the first inorganic acid solution is a mixed solution of phosphoric acid and a corrosion inhibitor.

5. The method of claim 4, wherein the phosphoric acid has a concentration of 100 g/L to 400 g/L, the corrosion inhibitor has a concentration of 2 g/L to 5 g/L, and an immersion time in the first inorganic acid solution ranges from 180 seconds to 540 seconds.

6. The method of claim 2, further comprising:
   immersing the ceramic to be treated into a degreasing agent to perform a first degreasing treatment;
   performing ultrasonic treatment to the ceramic subjected to the first degreasing treatment by using deionized water;
   immersing the ceramic subjected to the ultrasonic treatment into a first alkaline solution to perform a second degreasing treatment; and immersing the ceramic subjected to the second degreasing treatment into a second inorganic acid solution to neutralize alkaline substances on the surface of the ceramic.

7. The method of claim 6, wherein the degreasing agent has a concentration of 30 g/L to 100 g/L, and an immersion time in the degreasing agent ranges from 180 seconds to 600 seconds; the first alkaline solution is a sodium hydroxide solution having a concentration of 100 g/L to 200 g/L, and an immersion time in the sodium hydroxide solution ranges from 60 seconds to 360 seconds; and the second inorganic acid solution is a hydrochloric acid solution having a concentration of 40 g/L to 150 g/L, and an immersion time in the hydrochloric acid solution ranges from 30 seconds to 210 seconds.

8. The method of claim 2, further comprising:
immersing the material subjected to the second surface etching into a third inorganic acid solution to perform a first removal of impurities and dirt in the nanopores and on the surface; and
immersing the material subjected to the first removal of the impurities and dirt in the nanopores and on the surface into deionized water to finally remove the impurities and dirt in the nanopores and on the surface.

9. The method of claim 8, wherein the third inorganic acid solution is a nitric acid solution having a concentration of 50 g/L to 300 g/L and an immersion time in the nitric acid solution ranges from 30 seconds to 180 seconds.

10. The method of claim 1, wherein the material is stainless steel, and the step of immersing the material to be treated into the first inorganic acid solution and the fluoride acidic solution, respectively, to perform the surface etching, so that the nanopores are formed on the surface of the material to be treated comprises:
immersing the stainless steel to be treated into the first inorganic acid solution to perform a first surface etching; and
immersing the stainless steel subjected to the first surface etching into the fluoride acidic solution to perform a second surface etching, thereby obtaining a stainless steel having nanopores on the surface.

11. The method of claim 10, wherein the sodium fluoride has a concentration of 10 g/L to 50 g/L, the oxalic acid has a concentration of 20 g/L to 60 g/L, and an immersion time in the fluoride acidic solution ranges from 60 seconds to 600 seconds.

12. The method of claim 10, wherein the first inorganic acid solution is a mixed solution of hydrochloric acid, sulfuric acid, and a corrosion inhibitor.

13. The method of claim 12, wherein the hydrochloric acid has a concentration of 60 g/L to 300 g/L, the sulfuric acid has a concentration of 40 g/L to 200 g/L, the corrosion inhibitor has a concentration of 2 g/L to 5 g/L, and an immersion time in the first inorganic acid solution ranges from 60 seconds to 600 seconds.

14. The method of claim 10, further comprising:
immersing the stainless steel to be treated into a degreasing agent to perform a first degreasing treatment; and
immersing the stainless steel subjected to the first degreasing treatment into a second alkaline solution to finally remove oil stains from the surface of the stainless steel.

15. The method of claim 14, wherein the degreasing agent has a concentration of 30 g/L to 100 g/L, and an immersion time in the degreasing agent ranges from 180 seconds to 600 seconds, the second alkaline solution is a sodium carbonate solution having a concentration of 30 g/L to 80 g/L, and an immersion time in the sodium carbonate solution ranges from 60 seconds to 240 seconds.

16. The method of claim 10, further comprising:
immersing the material subjected to the second surface etching into a third inorganic acid solution to perform a first removal of impurities and dirt in the nanopores and on the surface; and
immersing the material subjected to the first removal of the impurities and dirt in the nanopores and on the surface into deionized water to finally remove the impurities and dirt in the nanopores and on the surface.

17. The method of claim 16, wherein the third inorganic acid solution is a nitric acid solution having a concentration of 40 g/L to 150 g/L and an immersion time in the nitric acid solution ranges from 30 seconds to 300 seconds.

* * * * *